(12) United States Patent
Svensson et al.

(10) Patent No.: US 8,754,543 B2
(45) Date of Patent: Jun. 17, 2014

(54) BATTERY ENERGY SOURCE ARRANGEMENT AND VOLTAGE SOURCE CONVERTER SYSTEM

(75) Inventors: Jan R. Svensson, Vasteras (SE); Georgios Demetriades, Västerås (SE); Bertil Nygren, Vasteras (SE); Falah Hosini, Vasteras (SE); Gerhard Brosig, Vasteras (SE); Gunnar Russberg, Vasteras (SE); Willy Hermansson, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 12/959,162

(22) Filed: Dec. 2, 2010

(65) Prior Publication Data

US 2011/0089763 A1    Apr. 21, 2011

Related U.S. Application Data

(63) Continuation of application No. PCT/EP2008/058247, filed on Jun. 27, 2008.

(51) Int. Cl.
*H02J 1/12* (2006.01)
*H02J 3/38* (2006.01)

(52) U.S. Cl.
CPC ........................................ *H02J 3/38* (2013.01)
USPC ......................................................... 307/46

(58) Field of Classification Search
CPC ............... H02M 2001/007; H02M 2001/0074; H02M 2001/0077; H02J 3/38
USPC ........................ 307/80, 46; 320/143, 126, 135
See application file for complete search history.

(56) References Cited

U.S. PATENT DOCUMENTS

| 6,058,032 | A  | * | 5/2000 | Yamanaka et al. .............. 363/71 |
| 6,304,059 | B1 |   | 10/2001 | Chalasani et al. |
| 6,680,856 | B2 | * | 1/2004 | Schreiber ........................ 363/71 |

(Continued)

FOREIGN PATENT DOCUMENTS

| CN | 1677787 A | 10/2005 |
| WO | 2005008266 A1 | 1/2005 |
| WO | 2007109001 A2 | 9/2007 |

OTHER PUBLICATIONS

International Preliminary Report on Patentability; PCT/EP2008/058247; Sep. 30, 2010; 7 pages.

(Continued)

*Primary Examiner* — Daniel Cavallari
(74) *Attorney, Agent, or Firm* — St. Onge Steward Johnston & Reens LLC

(57) ABSTRACT

The invention relates to power networks, and in particular to a battery energy source arrangement and voltage source converter system in such network. The battery energy source arrangement includes battery energy storage, having one or more parallel-connected battery strings and a mechanism for connecting a voltage of the battery strings to a load. The battery energy source arrangement further includes battery string voltage adapter devices connected in series with respective ones of the one or more battery strings wherein the battery string voltage adapter devices are designed to handle only a fraction of the voltage handled by the battery strings.

20 Claims, 2 Drawing Sheets

(56) References Cited

U.S. PATENT DOCUMENTS

| | | | |
|---|---|---|---|
| 7,869,230 B2* | 1/2011 | Huang et al. | 363/21.02 |
| 8,143,851 B2* | 3/2012 | Greening et al. | 320/116 |
| 2004/0009334 A1* | 1/2004 | Miyamoto et al. | 428/209 |
| 2005/0083722 A1* | 4/2005 | Emori et al. | 365/149 |
| 2005/0084745 A1* | 4/2005 | Colello et al. | 429/61 |
| 2010/0171472 A1* | 7/2010 | Angquist | 323/207 |
| 2011/0140530 A1* | 6/2011 | Demetriades et al. | 307/77 |

OTHER PUBLICATIONS

International Search Report and Written Opinion of the International Searching Authority; PCT/EP2008/058247; 15 pages.

The State Intellectual Property Office of the People's Republic of China Notification of 3rd Office Action Mailing Date: Feb. 8, 2014 Application No. 200880130038.3 8 pages.

* cited by examiner ically identical cells. The battery strings may then comprise unequal numbers of battery modules and still be operated in an optimized manner.

BATTERY ENERGY SOURCE ARRANGEMENT AND VOLTAGE SOURCE CONVERTER SYSTEM

CROSS-REFERENCE TO RELATED APPLICATIONS

The present application is a continuation of pending International patent application PCT/EP2008/058247 filed on Jun. 27, 2008, which designates the United States and the content of which is incorporated herein by reference.

FIELD OF THE INVENTION

The invention relates generally to the field of electric power transmission networks, and in particular to active power support in power transmission networks.

BACKGROUND OF THE INVENTION

It is sometimes advantageous to be able to control not only the reactive power, but also to inject or absorb active power, also denoted real power. The STATCOM can therefore be provided with an energy source on its DC side in order to provide some active power, in addition to the reactive power generated to the network. For example, the real power can be utilized either as a source of reserve power when an energy deficit occurs within the network, or as a control power for managing transients and electromechanical oscillations in the network. The energy source may for example comprise conventional capacitors, super capacitors or electrochemical batteries.

FIG. 1 illustrates a basic STATCOM arrangement, or voltage source converter system, having an active power source on its DC side, wherein the energy source in the illustrated example comprises a number of parallel-connected battery strings 2. Each battery string 2 comprises a number of battery modules and each battery module in turn contains a number of battery cells. The STATCOM 1 is also connected to a power network 3 in a conventional manner via a transformer (not shown) to adapt the converter voltage to the network voltage and to provide galvanic isolation.

Often, when electrochemical batteries are used as the energy source, a high number of battery modules must be connected in series to match the DC voltage of the STATCOM. Moreover, in order to obtain the desired active power and duration of the battery energy storage, a number of battery strings often has to be connected in parallel, as is illustrated in the figure. The STATCOM DC voltage is controlled and all the parallel-connected battery strings are connected to this controlled voltage.

During operation of the battery energy storage, the cells age differently. Further, some of the cells may have failed and in order to continue operation, the broken cell(s) of the battery modules of the battery string will be bypassed. Moreover, some aged battery modules will be replaced by new modules. For batteries with a low internal resistance, a small voltage offset will result in charge redistribution. The performance of the whole battery energy storage will be reduced, as it will be dominated by the battery cell with the lowest performance.

To bypass the failing battery cell(s) is thus done at the expense of reduced charging voltage of the battery string. Another solution is to bypass the whole battery string, but then an even greater capacity redundancy in the form of oversized batteries and additional battery strings would be required to meet capacity requirements at all times. Today, parallel-connected battery strings are thus not run in an optimal fashion.

In view of the above, it would be desirable to provide an improved way of handling failing battery cell(s) and/or battery strings.

SUMMARY OF THE INVENTION

It is an object of the invention to provide an active power source, and in particular a battery energy source arrangement, for a load, in particular a voltage source converter, wherein the above disadvantages are overcome or at least alleviated.

It is a particular object of the invention to provide a battery energy source arrangement for a voltage source converter wherein the maximum effect is obtained from the active power source, providing an optimized operation thereof.

It is another object of the invention to provide a battery energy source arrangement for a voltage source converter, wherein voltage differences due to performance variations of individual cells of a battery are prevented.

It is still another object of the invention to provide a battery energy source arrangement for a voltage source converter, wherein the service life of the battery energy source is maximized.

It is yet another object of the invention to provide a cost-efficient battery energy source arrangement.

These objects, among others, are achieved by a battery energy source arrangement and a voltage source converter as claimed in the appended independent claims.

In accordance with the invention an improved battery energy source arrangement is provided. The battery energy source arrangement comprises a battery energy storage, which in turn comprises one or more parallel-connected battery strings. The battery energy source arrangement further comprises connection means for connecting a voltage of the battery strings to a load, such as a voltage source converter. The battery energy source arrangement is characterized by battery string voltage adapter devices connected in series with a respective one of the one or more battery strings. The battery string voltage adapter devices are designed to handle only a fraction of the voltage handled by the battery strings. By means of the invention active power can be provided in an optimized manner. Maximum effect of the battery energy storage is enabled as well as fully loadable battery energy storage. Voltage differences due to performance variations of individual cells of the battery energy storage are prevented, thereby prolonging the service life of the battery energy storage. Further, by means of the invention, it is possible to disconnect parallel-connected battery strings faster compared to the state of the art. Further still, by means of the invention, the service life of circuit breakers used to disconnect battery strings can be prolonged, as the current in each battery string can be controlled to zero before the circuit breakers of each battery string are opened. As the battery string voltage adapter device is designed so as to be able to handle only a fraction of the total load voltage, the battery string voltage adapter device can be designed and dimensioned in a most cost-efficient manner.

In accordance with an embodiment of the invention, the battery string voltage adapter devices are arranged to add a certain voltage to their respective battery strings so that the voltage level of the battery strings are optimized. The optimization comprises in an embodiment to provide an equal voltage over each of the one or more battery strings including the string voltage adapter device. The service life of the battery energy storage is thereby maximized. In particular, the battery string voltage adapter devices may comprise means for adding a voltage equal to the difference of a controlled load voltage and an actual battery string voltage.

In accordance with an embodiment of the invention, the battery string voltage adapter device comprises a conventional H-bridge, which provides a cost efficient solution.

In accordance with another embodiment of the invention, the battery string voltage adapter device comprises further an overvoltage/short-circuit current protection device. The circuitry of the battery string voltage adapter device is thereby protected against overvoltages and short-circuit currents of the battery strings in a convenient manner.

Further embodiments are defined in the dependent claims.

The invention also relates to a voltage source converter system comprising a voltage source converter and a battery energy source arrangement, whereby advantages similar to the above are achieved.

DETAILED DESCRIPTION OF THE INVENTION

Figure 1:
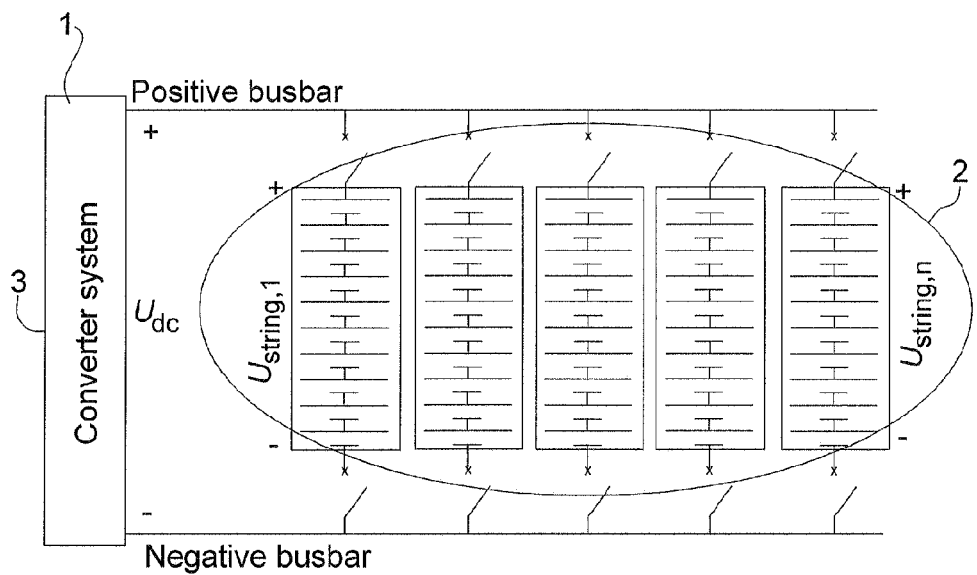
FIG. 1 illustrates a prior art arrangement.
Figure 2:
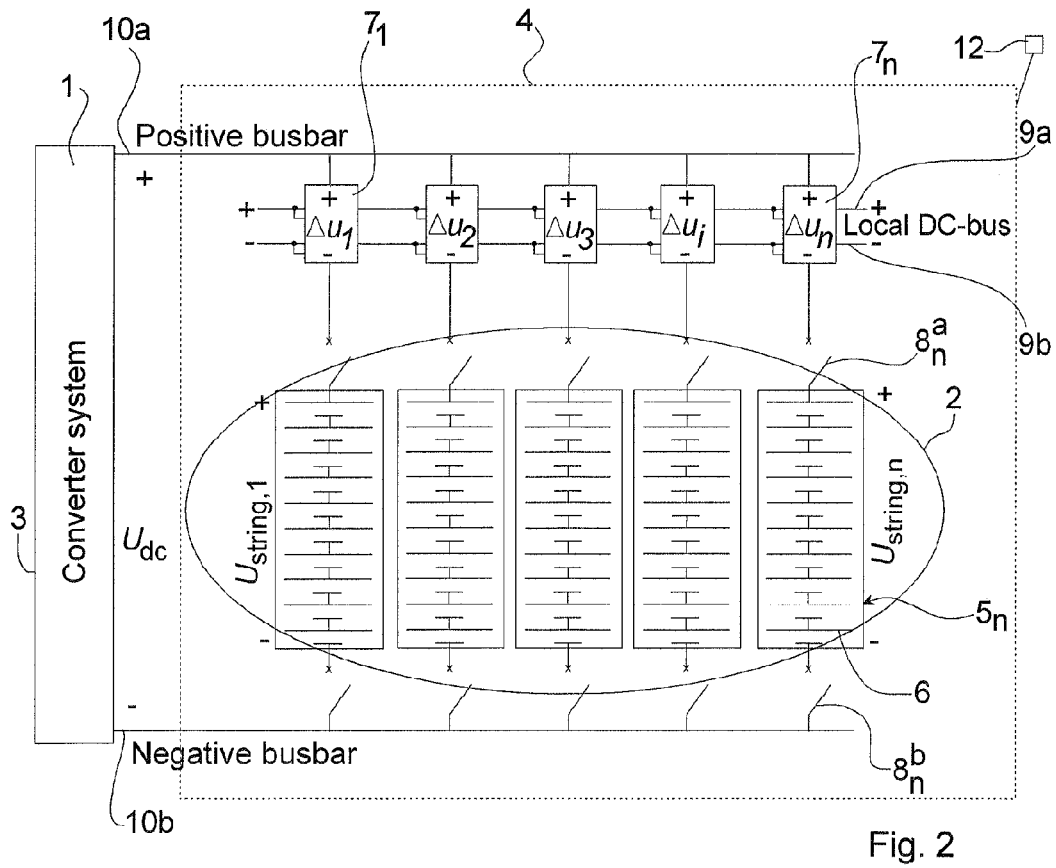
FIG. 2 illustrates an embodiment of a battery energy source arrangement for a voltage source converter in accordance with the present invention.

FIG. 2 illustrates an embodiment of the invention. The same reference numerals are used throughout the figures for same or corresponding parts.

A battery energy source arrangement 4 in accordance with the invention comprises connection means for being connected in parallel with a voltage source converter 1 and further comprises a battery energy storage 2, preferably comprising lithium ion batteries, and battery string voltage adapter devices $7_i$, in the following denoted adapter devices $7_i$.

The battery energy storage 2 comprises one or more battery strings $5_1, \ldots, 5_i, \ldots, 5_n$ connected electrically in parallel across common busbars 10a, 10b. Each battery string $5_1, \ldots, 5_i, \ldots, 5_n$ comprises series connected battery modules, wherein each battery module comprises battery cells 6, having any suitable nominal individual voltage, for example 3.4 V. Further, any suitable number of battery cells 6 can be connected electrically in series giving a suitable nominal voltage, e.g. 624 V, for a battery module. Several series-connected battery modules make up a battery string $5_i$ to provide for example 10 kV up to 80 kV DC or more depending on for example power levels of the load to which the battery energy source arrangement 4 is connected and the desired duration of the battery energy source arrangement 4. Several battery strings $5_1, \ldots 5_i, \ldots, 5_n$ may be connected in parallel to provide necessary power and energy.

In the present application, the battery strings 5 are high-voltage battery strings and an increased need of active power can be met by adding a suitable number of parallel-connected battery strings. Each battery string $5_1, \ldots, 5_i, \ldots, 5_n$ is connected in parallel with the voltage source converter 1.

As mentioned, the battery energy source arrangement 4 further comprises adapter devices $7_1, \ldots, 7_i, \ldots, 7_n$, one for each battery string $5_1, \ldots, 5_i, \ldots, 5_n$. The adapter devices $7_1, \ldots, 7_i, \ldots, 7_n$ are connected in series with each respective battery string $5_1, \ldots, 5_i, \ldots, 5_n$. In particular, the adapter device $7_i$ is connected to a battery string $5_i$ preferably via a DC breaker $8_n^a$. The adapter device $7_i$ is also connected to a local DC bus 9a, 9b. The adapter devices $7_1, \ldots, 7_i, \ldots, 7_n$ provide an optimized operation of the battery energy storage 2, as will be described in the following.

The adapter device $7_i$ is arranged to add, upon need, a voltage $\Delta u_i$ to the battery string $5_i$ to which it is connected. Each battery string $5_1, \ldots 5_i, \ldots, 5_n$ has its own adapter device $7_1, \ldots, 7_i, \ldots, 7_n$. If one or more battery cells 6 of the battery string $5_i$ fail they may be bypassed by any known bypass arrangement (not shown). The adapter device $7_i$ for the battery string $5_i$ comprising the failing and bypassed battery cell(s) 6 then adds a suitable voltage $\Delta u_i$ to the battery string $5_i$. The voltage $\Delta u_i$ is chosen so as to render the battery string voltage $u_{string, i}$ optimal, for example optimal in the sense of providing maximum effect and enabling the battery string $5_i$ to be fully loaded.

All the battery strings $5_1, \ldots, 5_i, \ldots, 5_n$ preferably have the same value of the battery current. Thereby all the batteries will become fully charged and also discharged at the same time. However, due to different reasons, e.g. failing cells, the battery strings $5_1, \ldots, 5_i, \ldots, 5_n$ have different voltage levels for the same current level. The adapter device $7_i$ is therefore connected to each battery string $5_i$ in order to adapt the voltage level of the respective battery string $7_i$.

In order to provide a cost efficient design, the voltage potential between the adapter devices $7_1, \ldots, 7_i, \ldots, 7_n$ is preferably about the same. All the adapter devices $7_1, \ldots, 7_i, \ldots, 7_n$ are connected together with a local DC bus 9a, 9b. All the adapter devices $7_1, \ldots, 7_i, \ldots, 7_n$ are further connected either to the positive 10a or the negative 10b busbar of a bus 10a, 10b connecting the battery strings to load, such as the voltage source converter 1. The local energy storage, e.g. a capacitor, of each of the adapter devices $7_1, \ldots, 7_i, \ldots, 7_n$ is limited and the local DC-voltage bus 9a, 9b is in an embodiment of the invention used for transferring energy between the adapter devices $7_1, \ldots, 7_i, \ldots, 7_n$.

More in detail, in order to keep the voltage level of the local DC bus arrangement 9a, 9b constant, the total power of all adapter devices $7_1, \ldots, 7_i, \ldots, 7_n$ should be zero. Assuming that the current of the battery strings $5_1, \ldots, 5_i, \ldots, 5_n$ are equal gives $$I_{string\ 1} = i_{string\ 2} = \ldots = i_{string\ n}$$

The average voltage of all the battery strings $5_1, \ldots, 5_i, \ldots, 5_n$ should be equal to the controlled DC voltage $U_{dc}$ from the voltage source converter 1:

$$\frac{1}{n}(U_{string1} + U_{string2} + \ldots + U_{stringn}) = U_{dc}$$

The added voltages $\Delta u_i$ should therefore be set according to:

$$\Delta u_1 = U_{dc} - U_{string1}$$

$$\Delta u_2 = U_{dc} - U_{string2}$$

$$\Delta u_n = U_{dc} - U_{stringn}$$

The voltages $\Delta u_i$ are controlled by a control system, schematically indicated at reference numeral 12. The control system 12 retrieves data from different parts of the system, for example voltages and currents of the battery strings and voltage source converter voltages.

The control system 12 comprises software and algorithms for performing the voltage adaptation of the individual battery strings $5_1, \ldots, 5_i, \ldots, 5_n$. In particular, the control system 12 comprises means for determining the individual battery string voltages and means for controlling the voltages of the individual battery strings so as to be optimal, for example by software implementing algorithms utilizing the above equations. The algorithms may be programmed for optimizing the voltage of the battery strings $5_1, \ldots, 5_i, \ldots, 5_n$ so that an equal voltage over each of the battery strings $5_1, \ldots, 5_i, \ldots, 5_n$ and their corresponding adapter device is accomplished: $U_1 + \Delta u_1 = \ldots = U_{string\ i} \Delta u_i = \ldots = U_n + \Delta u_n$. For example, so that the added voltages $\Delta u_1, \ldots, \Delta u_i, \ldots \Delta u_n$ are equal to the difference of the controlled load voltage $U_{dc}$ and the actual battery string voltage.

Figure 3:
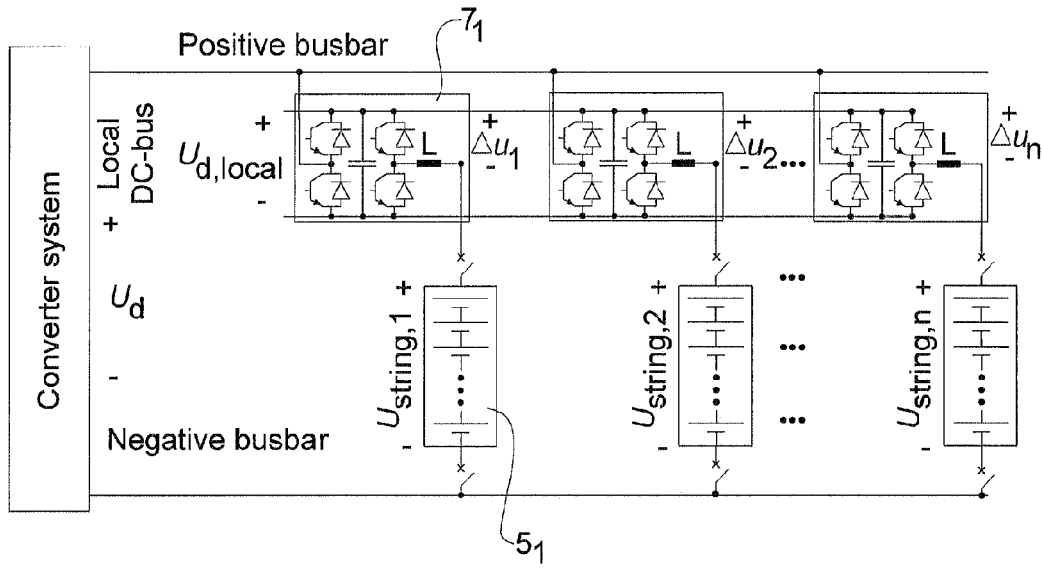
FIG. 3 illustrates an embodiment of a battery string voltage adapter device in accordance with the invention.

FIG. 3 illustrates an embodiment of the adapter device $7_i$ in accordance with the invention. The adapter device $7_i$ need only handle a fraction of the voltage that the battery string $5_i$ handles and the components can be chosen accordingly. The illustrated adapter device $7_i$ comprises an H bridge, having four switching elements in a conventional manner. A standard H-bridge design may be used. In particular, the H-bridge consists of two phase-legs, each having two valves in series. Each valve consists of a controllable power semiconductor, for instance a MOSFET (metal-oxide-semiconductor field-effect transistor), an IGCT (Integrated Gate Commutated Thyristor) or an IGBT (Insulated-Gate Bipolar Transistor) and an anti-parallel diode. In parallel with the two phase-legs a capacitor is connected in such a way as to form a loop with low inductance. To achieve the function in accordance with the invention, the mid-point in between the two valves of one of the two phase-legs of the H-bridge is connected to the positive busbar 10a, whereas the mid-point of the other phase-leg in the H-bridge is connected to the positive terminal of the battery string through a reactor. Furthermore, to achieve the function in accordance with the invention, the connection described above is repeated for each of the parallel battery strings. The described embodiment thus comprises as many H-bridges as the number of battery strings connected in parallel. Several methods can be adopted and implemented in the control system 12 for controlling the valves. However, the total size of all the capacitors of the H-bridges should be chosen such that the resulting voltage variations on the local DC bus 9a, 9b are acceptable.

The adapter device $7_i$ is preferably self-supporting, i.e. needs no external power source. In the above-described embodiment of the adapter device $7_i$ may be blocked, by means of signals from the control system 12, so as to load the capacitor of the adapter device. Thereby no external voltage source is required.

Figure 4:
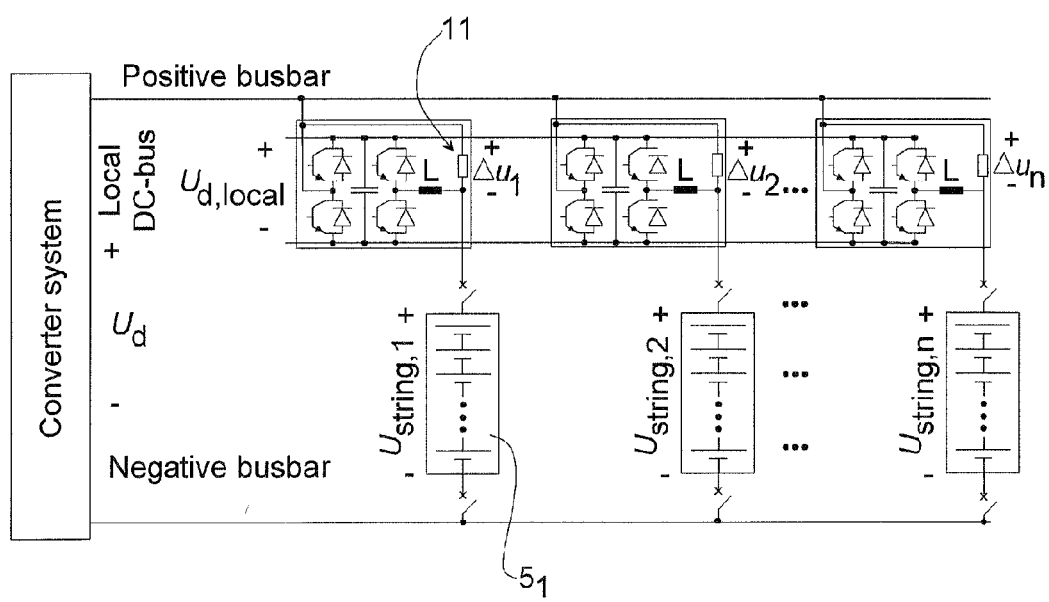
FIG. 4 illustrates another embodiment of a battery string voltage adapter device in accordance with the invention.

FIG. 4 illustrates another embodiment of an adapter device for use in the invention. In particular, in order to protect the adapter devices against over-voltages and short-circuits in the battery strings, a protection circuit 11 is preferably used for handling overvoltage and short-circuit currents. Any suitable protection circuit 11 design may be used.

In FIG. 2 conventional DC breakers $8_i^a, 8_i^b$ are illustrated connected to the plus and minus pole of the battery strings $5_i$ and to the positive and negative DC busbar 10a, 10b. The DC breakers $8_i^a, 8_i^b$, two for each battery string $5_i$, are arranged to connect and disconnect the battery strings $5_i$. The adapter device $7_i$ in accordance with the invention provides an additional advantage in that the current in each battery string $5_i$ can be controlled to zero before the DC breakers $8_i^a, 8_i^b$ of each respective battery string are opened. The service life of the DC breakers $8_i^a, 8_i^b$ can thereby be prolonged. In particular, the adapter device $7_i$ of a particular battery string $5_i$ may be blocked and when the current through the particular battery string is zero, the battery string can be readily disconnected.

Alternatively, the time for disconnecting the battery strings $5_i$ can be minimized. In the prior art, the battery strings are disconnected by adapting the converter 3 DC-voltage to a first battery string $5_i$ and then the DC breakers $8_i^a, 8_i^b$ are opened. This procedure is then repeated for each battery string. By means of the innovative battery energy source arrangement 4, great timesavings can be accomplished by controlling the battery string currents and then opening the DC breakers $8_i^a, 8_i^b$ simultaneously.

The present invention provides another advantage in that the battery strings may be connected into an operative state more rapidly than prior art solutions. More particularly, when the battery strings are disconnected from its load, for example a voltage source converter, they may be connected to each other. Thereby the voltages of the battery strings and their respective adapter devices may be redistributed and all battery strings and their respective adapter devices may be loaded to the same level. Having the battery strings equally loaded in turn enables a fast connection to the operative state, i.e. connection to the voltage source converter.

The present invention provides yet another advantage in that short-circuits of the battery strings can be easily detected. In particular, if the voltage over the local DC bus comprises sudden increases this can be taken as an indication of one or more failing battery strings. Appropriate action can then be taken quickly. It is further possible to determine which one of the battery strings is failing. This can be done by measuring the current in each battery string, as a short-circuited battery string has an increased current.

It is noted that the adapter device $7_i$ of the invention only need to be able to handle a fraction of the total load voltage, for example a few percent. As an example, if the battery string $5_i$ is dimensioned for a voltage of about 80 kV, then the adapter device $7_i$ may be dimensioned to handle a voltage of, for example, 1-3 kV. The adapter device can thus be accordingly dimensioned in a most cost-efficient manner.

It is further noted that it is possible to utilize different currents in the different battery strings. In particular, the battery strings may have different capacity or be of different types, and battery sources of different loading can thus still be used, providing a cost-efficient solution wherein there is no need to unnecessarily discard battery strings.

A voltage source converter system in accordance with the invention comprises a voltage source converter 1 and a battery energy source arrangement 4 as described above.

Although not shown in the figures, additional DC power source(s) may be connected in parallel with the voltage source converter 1 of such voltage source converter system. One such additional DC power source conventionally used is capacitor devices.

What is claimed is:

1. A battery energy source arrangement comprising:
    a battery energy storage having at least two parallel-connected battery strings, each battery string comprising a plurality of series connected batteries where each battery has a maximum battery voltage, where the total of each maximum battery voltage for each series connected battery comprises a battery string voltage, and
    a mechanism for connecting a voltage of said battery strings to a load,
    said battery energy source arrangement further comprising battery string voltage adapter devices connected in series with respective ones of said at least two battery strings, wherein said battery string voltage adapter devices are rated to output a maximum voltage that is only a fraction of said battery string voltage of said battery string to which the respective battery string voltage device is connected.

2. The battery energy source arrangement as claimed in claim 1, wherein said battery string voltage adapter devices add a voltage to the battery string voltage of a respective battery string so as to optimize the voltage level of said battery strings.

3. The battery energy source arrangement as claimed in claim 2, wherein said battery string voltage adapter devices are arranged to add an equal voltage over each of said one or more battery strings and their respective battery string voltage adapter devices.

4. The battery energy source arrangement as claimed in claim 1, wherein said battery string voltage adapter devices include circuitry for adding a voltage equal to the difference of a controlled load voltage and an actual battery string voltage.

5. The battery energy source arrangement as claimed in claim 1, further comprising a control system, wherein said battery string voltage adapter devices are controlled by said control system.

6. The battery energy source arrangement as claimed in claim 5, wherein said control system is arranged to control said battery string voltage adapter devices to provide an equal voltage over each of the one or more battery strings including the string voltage adapter device.

7. The battery energy source arrangement as claimed in claim 1, wherein said battery string voltage adapter device comprises an H-bridge.

8. The battery energy source arrangement as claimed in claim 7, wherein the voltage of said battery string voltage adapter device is provided by a capacitor of said battery string voltage adapter device.

9. The battery energy source arrangement as claimed in claim 7, wherein said battery string voltage adapter device further comprises an overvoltage and short-circuit current protection device.

10. The battery energy source arrangement as claimed in claim 1, wherein said battery energy source arrangement is coupled to a high-voltage power network operating at 35,000 Volts or higher.

11. The battery energy source arrangement as claimed in claim 1, wherein said battery energy source arrangement is coupled to a voltage source converter.

12. A voltage source converter system comprising a voltage source converter and a battery energy source arrangement as claimed in claim 1, wherein said battery energy source arrangement is parallel-connected to the voltage source converter.

13. The voltage source converter as claimed in claim 12, wherein said battery energy source arrangement and said voltage source converter are connected across a common busbar.

14. The voltage source converter as claimed in claim 12, wherein said voltage source converter is coupled to a high voltage power network operating at 35,000 Volts or higher.

15. The voltage source converter as claimed in claim 12, wherein said battery string voltage adapter devices are coupled to a local busbar, which in turn is coupled to a common busbar and to said battery string of said battery energy source arrangement.

16. A battery energy source arrangement comprising:
a battery energy storage having one battery string that is comprised of a plurality of series connected batteries where each battery has a maximum battery voltage, and where the total of each maximum battery voltage for each series connected battery comprises a battery string voltage, and
a mechanism for connecting a voltage of said battery string to a load, said battery energy source arrangement further comprising a battery string voltage adapter device connected in series with the battery string,
wherein said battery string voltage adapter device is rated to output a maximum voltage that is only a fraction of said battery string voltage of said battery string to which the respective battery string voltage device is connected.

17. The battery energy source arrangement as claimed in claim 16, wherein said battery string voltage adapter device includes circuitry for adding a voltage equal to the difference of a controlled load voltage and an actual battery string voltage.

18. The battery energy source arrangement as claimed in claim 16, wherein said battery string voltage adapter device includes a capacitor.

19. The battery energy source arrangement as claimed in claim 16, wherein said battery string voltage adapter device includes an overvoltage and short-circuit current protection device.

20. A voltage source converter system comprising a voltage source converter and a battery energy source arrangement as claimed in claim 16, wherein said battery energy source arrangement is parallel-connected to the voltage source converter.

* * * * *